United States Patent

[11] 3,620,569

[72] Inventor Earl Mathis
c/o Alme Agency Co., 8301 Maryland Ave., St. Louis, Mo. 63105
[21] Appl. No. 863,088
[22] Filed Oct. 2, 1969
[45] Patented Nov. 16, 1971

[54] SEAT SAFETY HARNESS
6 Claims, 5 Drawing Figs.
[52] U.S. Cl. ........................................ 297/388, 297/389, 280/150 SB
[51] Int. Cl. ........................................ B60r 21/10, A47d 15/00
[50] Field of Search ........................................ 297/216, 385, 388, 389; 280/150

[56] References Cited
UNITED STATES PATENTS
| | | | |
|---|---|---|---|
| 2,825,581 | 3/1958 | Knight | 280/150 SB |
| 2,833,555 | 5/1958 | Zotkewicz | 297/389 |
| 3,321,246 | 5/1967 | Davies | 297/389 |
| 3,348,881 | 10/1967 | Weman | 297/389 X |
| 3,488,090 | 1/1970 | Douglas | 297/389 |

Primary Examiner—Casmir A. Nunberg
Attorney—Cohn and Powell

ABSTRACT: A seat safety harness having a pair of shoulder-lap straps arranged to pass over the shoulders of the seat occupant, each strap having a first end adapted to be reeled onto the spring-loaded spool of a first retraction reel assembly of the inertia type mounted substantially behind the seat occupant, and having a second end attached to one of the attachment means located substantially below the lap of the seat occupant, at least one of the second ends of the straps being reeled onto a spring-loaded spool of a second retraction reel assembly of the inertia type that constitutes at least one of the attachment means. Quick-release buckles are fixed to the straps and are selectively connectable to provide two shoulder strap portions and a lap strap portion. The spring loading of the spool of the second retraction reel assembly is greater than the spring loading of the spool of the first retraction reel assembly so that the harness is self-adjusting when worn by the occupant and is self-storing when not in use. Strap guides slidably receive the straps between the second retraction reel assembly and the buckles so that the buckles engage the guides to limit reel takeup on the associated spool before the straps have unreeled from the spool of the first retraction reel assembly. In one embodiment, a pair of spring-loaded spools of the second retraction reel assembly are mounted, one on each side of the seat, the second strap ends extending down over opposite seat sides for connection to such spools. In another embodiment, the spools of the second retraction reel assembly are mounted at the rear of the seat, the second strap ends extending down between the seat portion and back portion of a seat for connection to the spools.

PATENTED NOV 16 1971 3,620,569

Inventor
EARL MATHIS

By Cohn and Powell
Attorneys

SEAT SAFETY HARNESS

BACKGROUND OF THE INVENTION

This invention relates generally to improvements in a seat safety harness, and particularly to improvements in harnesses in vehicles such as automobiles.

The heretofore conventional car seat harnesses utilized a lap strap that prevented the occupant from moving off the seat, and utilized a diagonal strap extending from a point of attachment to the lap strap up and across the occupant's chest and one shoulder to a side anchorage point at about the level of the occupant's head, which prevented the occupant's torso from moving forward. In most cases, the diagonal strap constituted an extension of one portion of one of the lap straps and was anchored to the door post of the vehicle. This type of diagonal strap could constitute a hazard in certain types of collisions in that it could come into contact with the occupant's neck if it were not carefully fitted to the vehicle and manually adjusted by the occupant to the correct length. Moreover, such diagonal strap hangs untidily at the side of the automobile.

In other prior safety harnesses, twin shoulder straps pass up over the seat occupant's shoulder, and a harness reel of the inertia type is mounted on the back or base of the seat to reel in the straps. One end of each of these straps is fixed at an anchorage point at the side of the seat. This type of harness requires sliding buckles on the straps in order to adjust to the occupant's lap and other portions of the occupant's body. The mounting of these sliding buckles to these straps is difficult to attain, constitutes a wear upon the straps, and a subject to undesirable sliding movement under stress conditions. This type of harness is not self-adjusting to the occupants's body, but rather the lower portion of the occupant's body, primarily the hips and lap, is restricted against normal movement.

SUMMARY OF THE INVENTION

The present seat safety harness includes a pair of shoulder-lap straps arranged to pass over the shoulders of the seat occupant, each strap having a first end adapted to be reeled onto the spring-loaded spool means of a first retraction reel means of the inertia type that is substantially behind the seat occupant, and having a second end attached to one of the attachment means located substantially below the lap of the seat occupant. At least one of the second strap ends is reeled onto a spool means of a second retraction reel means of the inertial type that constitutes at least one of the attachment means. Connector means are fixed to the straps and are selectively connectable to provide two shoulder strap portions and a lap strap portion. The spring loading of the spool means of the second retraction reel means is greater than the spring loading of the spool means of the first retraction reel means so that the harness is self-adjusting when worn by the occupant and is self-storing when not in use.

This safety harness eliminates the present-day confusing and messy tangling of webbing, and provides for the use of a combination lap belt and shoulder harness that is as easy to use as the heretofore conventional lap belt equipment by itself. It will be understood that a combination of effective shoulder harness with lap belt offers much greater protection than the usual seat lap belt alone. The present safety harness, providing this combination of protection, is as easy to put on as a lap belt, stores itself neatly, is always handy to grasp, there being no groping for buckles or straps, is completely self-adjusting to the occupant's body, there being no loosening or tightening, and after the occupant puts on the shoulder straps, he need only connect one pair of quick-release buckles or other connector means, there being no complicated multiple buckles, slidable connectors and the like.

The inertia reels of the present safety harness permit the straps to unreel as required during normal movements of the occupant, both torso, hips and lap, but locks the straps to prevent unreeling if the reels or the straps are subjected to a sudden jerk, as would be occasioned by a collision of the vehicle. The arrangement provides greater freedom to the occupant's ordinary movements than the conventional diagonal strap or lap strap, either solely or in combination, and yet the shoulder-lap straps hold the occupant securely in the seat in the event of collision.

When the straps are not worn by the occupant, the straps are reeled automatically onto the inertia reels to take up any slack, and are considered to be self-storing.

More particularly, the safety harness includes a first retraction reel means of the inertia type mounted substantially behind the seat occupant, and a second retraction reel means of the inertia type mounted substantially below the lap of the seat occupant, both retraction means including a rotatable strap-receiving spool means to receive a strap end and reel it automatically onto the spool means under spring action. A pair of shoulder-lap straps are arranged to pass over the shoulders of the occupant, each strap having an end adapted to be reeled onto the spool means of the first retraction reel means, and having another end adapted to be reeled onto the spool means of the second retraction reel means. A connector means is fixed to the straps and is selectively connectable to provide two shoulder strap portions and a lap strap portion. The connector means includes two parts, each part fixed in position on one of the shoulder-lap straps. Because the spring loading of the spool means of the second retraction reel means is greater than the spring loading of the spool means of the first retraction reel means, the lap strap portion is held firmly across the lap of the occupant, and the harness is self-adjusting to the torso, hips and lap of the occupant when worn.

The harness includes a limit means coacting with the straps to limit reel takeup on the spool means of the second retraction reel means before the straps have completely unreeled from the spool means of the first retraction reel means. These limit means can consist of strap guides that slidably receive the straps between the spool means of the second retraction reel means and the connector means, the connector means engaging the guides to limit reel takeup.

For an individual or bucket seat, the spring-loaded spool means of the second retraction reel means are mounted on each side of the seat, the second strap ends extending down over opposite seat sides for connection to the spool means. In an individual or a bench seat assembly, the spool means of the second retraction real means can be mounted at the rear of the seat, the strap ends extending down between the seat portion and back portion for connection to such spool means.

DESCRIPTION OF THE PREFERRED EMBODIMENTS

Figure 1:
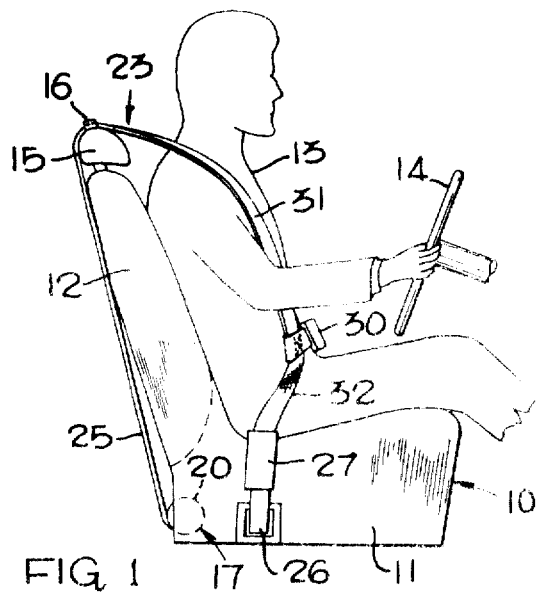
FIG. 1 is a side-elevational view of a seat equipped with the safety harness, the harness being worn by an occupant.
Figure 3:
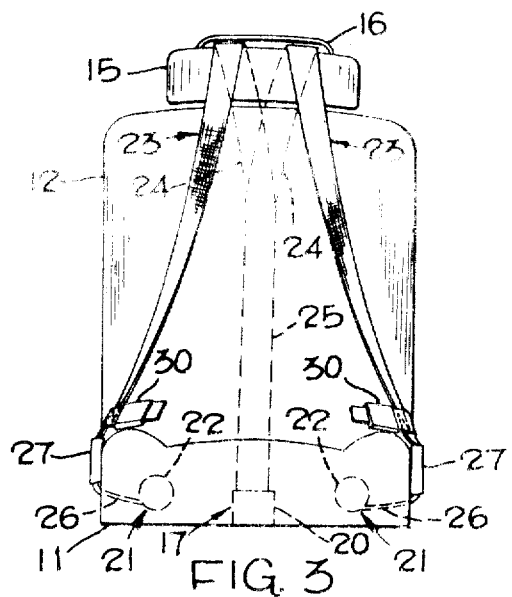
FIG. 3 is a front-elevational view, similar to FIG. 2, but showing the straps disconnected and stored.
Figure 2:
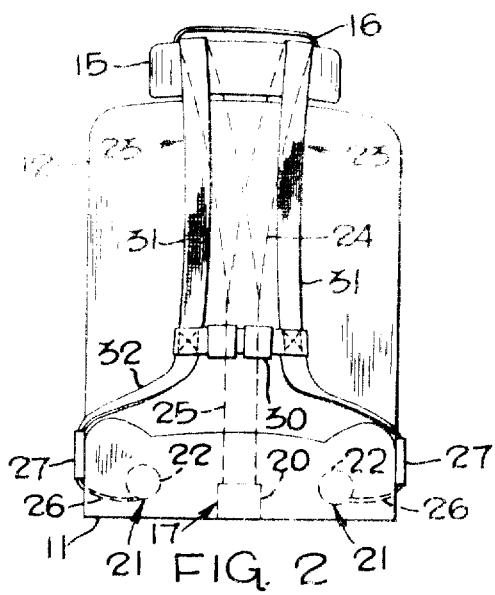
FIG. 2 is a front-elevational view of the harness shown in FIG. 1, but omitting the occupant for sake of clarity.

Referring now by characters of reference to the drawing, the first to the embodiment illustrated in FIGS. 1-3, it will be understood that the seat 10 includes a seat portion 11 and a back portion 12. An occupant 13 is seated in seat 10 behind a steering wheel 14, as is illustrated in FIG. 1. Attached to the top of the seat back portion 12 is a headrest 15, the headrest 15 including an inverted U-shaped strap guide 16. Preferably, the top of the headrest 15 is located above the level of the occupants's shoulders.

The seat safety harness includes a first retraction reel means, generally indicated by 17, of the inertia type mounted behind the seat occupant 13 and carried centrally at the rear of the seat portion 11. This retraction reel means 17 includes a rotatable strap-receiving spool 20 that is spring loaded and adapted to receive a strap end and reel automatically onto the spool under spring action. This spool is of the type that normally allows such strap to be reeled off freely, against the action of a retraction spring, but which locks if there is a sudden, abnormal pull on the strap.

A pair of strap attachment means is located substantially below the lap of the seat occupant. In the embodiment of FIGS. 1-3, such anchorage means consists of a retraction reel means, referred to by 21, of the inertia type incorporating a common inertia locking mechanism acting on spring-loaded spools 22. One of the retraction reel means 21 is carried at each side of the seat portion 11. As is conventional and well known, an inertia spool of the type having a g-pendulum sensitive to vehicle accelerations is employed.

A pair of shoulder-lap straps generally indicated by 23, is arranged to pass over the shoulders of the occupant 13. One end 24 of each strap 23 passes over the headrest 15 and through the strap guide 16, the strap ends 24 being connected together at the rear of the seat back portion 12 to provide a Y-configuration.

The resultant single strap end 25 extends downwardly and is operatively connected to the spool 20 of the retraction reel means 27. It will be understood that a pair of spools 20 could be used to receive separate strap ends 24 if desired.

The opposite end 26 of each strap 23 extends down along the side of the seat portion 11 and is operatively connected to the associated spool 22 of the retraction reel means 21 mounted at the seat side. To guide the straps 23 during extension and retraction onto the spools 22 of the retraction reel means 21, a strap guide 27 is fixed to each side of the seat portion 11. Each strap guide 27 slidably receives the strap end 26 of the associated strap.

Fixedly mounted on the straps 23 is a pair of quick-release buckles 30, constituting connector means. The buckles 30 are located in fixed position on the straps 23 so that each buckle 30 can engage its associated strap guide 27 to limit reel takeup on the spool 22 of the retraction reel means 21 before the strap 23 has completely unreeled from the spool 20 of the retraction reel means 17 when the occupant 13 removes the harness and the straps are automatically reeled in for storage. When the occupant 13 slips the straps 23 over the shoulders, the buckles 30 are pulled up and operatively interconnected over the occupants's lap so that the harness provides a pair of shoulder strap portions 31 and a lap strap portion 32, as is best illustrated in FIG. 2.

Importantly, the spring loading of the spool 22 of the retraction reel means 21 is greater than the spring loading of the spool 20 of the retraction reel means 17. With this structural characteristic, when the straps 23 are placed on the occupant and interconnected by the buckles 30, the shoulder strap portions 31 will adjust automatically to the torso of the occupant and the lap strap portion 32 will adjust automatically to the hips and lap of the occupant. Even though the lap strap portion 32 of the harness is held firmly across the occupants's hips and lap as a result of the comparative spring loading described previously, the lower portion of the occupant can move freely without any undue restriction of the occupant's hips and legs. Of course, the torso of the occupant can be moved freely without undue restriction as to normal action, while held firmly by the shoulder strap portions 31. This particular safety harness permits more freedom for the normal movements and actions of the occupant, while at the same time providing the maximum amount of restraint and protection at the time of a collision. Under the abnormal, sudden strain imparted to the straps 23 as when there is a collision, the retraction reel means 17 and 21 will automatically lock to hold the torso, hips and lower portions of the occupant securely in the seat 10.

When the occupant 13 removes the safety harness by disconnecting the buckles 30 and slipping the straps 23 off the shoulders, the slack of the straps 23 is taken up by the reeling in of the strap ends 26 onto the spools 22 of retraction reel means 21, as is best shown in FIG. 3. The spring loading of the retraction reel means 17 and 21 cause self-storing of the straps 23 and hold the straps 23 relatively taut.

Figure 4:
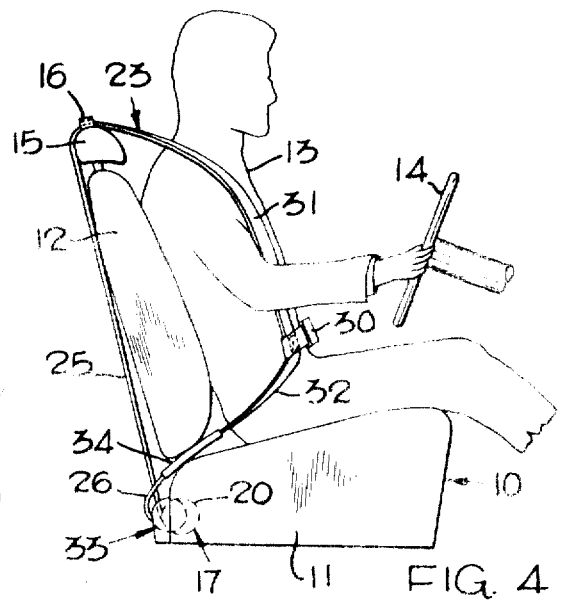
FIG. 4 is a side-elevational view, similar to FIG. 1, but showing a modified form of the safety harness.
Figure 5:
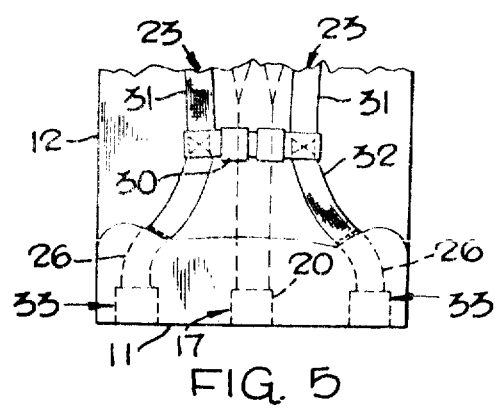
FIG. 5 is a fragmentary, front-elevational view of the safety harness illustrated in FIG. 4.

The embodiment of the safety harness shown in FIGS. 4-5 is substantially the same as that previously described with the exception of the location of the retraction reel means 33 which corresponds to the retraction reel means 21 of the previously described embodiment. Instead of being mounted at the sides of the seat portion 11, the retraction reel means 33 are mounted at the rear of the seat portion 11 and below the lap and at the sides of the occupant 13. Strap guides 34 are located between the seat portion 10 and the back portion 12 and slidably engage the ends 26 of straps 23. Otherwise, the structure and functional advantages of the safety harness shown in FIGS. 4-5 are identical to that previously described with respect to the harness of FIG. 1-3.

It will be understood that the strap ends 24 of the harness straps 23 can be separately wound onto a single inertia spool or two separate inertia spools. Similarly, the strap ends 26 can be wound onto a single inertia spool instead of the two separate spools as shown and described. If desired, the inertia spool 20 receiving the strap ends 24 can be located inside of the headrest 15, such headrest being either an integral part of the seat back portion 12 or a separate item secured to the back portion 12.

I claim as my invention:

1. A seat safety harness, comprising:
   a. a first retraction reel means of the inertia type mounted substantially behind the seat occupant,
   b. a pair of attachment means located substantially below the lap of the seat occupant, at least one of the attachment means including a second retraction reel means of the inertia type,
   c. a pair of shoulder-lap straps arranged to pass over the shoulders of the seat occupant, each strap having a first end adapted to be reeled onto the first retraction reel means, and having a second end attached to one of the attachment means, at least one of the second ends being reeled onto the second retraction reel means,
   d. connector means fixed to the straps and selectively connectable to provide two shoulder strap portions and a lap strap, and
   e. the spring loading of the second retraction reel means being greater than the spring loading of the first retraction reel means to urge the straps toward the second retraction reel means so that the harness is self-adjusting when worn by the occupant, the lap strap portion being held firmly across the occupant'3 lap, and so that the harness is self-storing when not in use.

2. A seat safety harness, comprising:
   a. a first retraction reel means of the inertia type mounted substantially behind the seat occupant, the first retraction reel means including a first rotatable strap-receiving spool means to receive a strap and reel it automatically onto the first spool means under spring action,
   b. a second retraction reel means of the inertia type mounted substantially below the lap of the seat occupant, the second retraction reel means including a second rotatable strap-receiving spool means to receive a strap and reel it automatically onto the second spool means under spring action,
   c. a pair of shoulder-lap straps arranged to pass over the shoulders of the seat occupant, each strap having a first end adapted to be reeled onto the first spool means, and having a second end adapted to be reeled onto the second spool means, and
   d. the spring loading of the second spool means being greater than the spring loading of the first spool means to urge the straps toward the second spool means so that the harness is self-adjusting when worn by the occupant and is self-storing when not in use.

3. A seat safety harness as defined in claim 2, in which:
   e. connector means are fixed to the straps and selectively connectable to provide two shoulder strap portions and a lap strap portion, the greater spring loading of the second spool means holding the lap strap portion firmly across the lap of the occupant by urging said portion toward said second spool means.

5. A seat safety harness as defined in claim 2, in which:
e. limit means coact with the straps to limit reel takeup on the second spool means before the straps have unreeled from the first spool means under pull from the second spool means.

5. A seat safety harness as defined in claim 2, in which:
e. connector means are fixed to the straps and selectively interconnectable to provide two shoulder strap portions and a lap strap portion, the greater spring loading of the second spool means holding the lap strap portion firmly across the lap of the occupant, by urging said portion toward said second spool means, and
f. strap guides selectively receive the straps between the second spool means and the connector means, the connector means engaging the guides to limit reel takeup on the second spool means before the straps are unreeled from the first spool means.

6. A seat safety harness as defined in claim 2, in which
e. the second spool means includes a pair of spring loaded spools mounted on each side of the seat and having a combined spring loading greater than the spring loading of the first spool means, the second strap end extending over the seat sides for connection to said spools.

* * * * *